(12) United States Patent
Delaplagne et al.

(10) Patent No.: US 12,224,588 B2
(45) Date of Patent: Feb. 11, 2025

(54) METHOD FOR CONTROLLING A POWER SUPPLIED TO AN ELECTRICAL NETWORK, WITH HYBRIDIZATION CONTROLLER

(71) Applicant: COMMISSARIAT A L'ENERGIE ATOMIQUE ET AUX ENERGIES ALTERNATIVES, Paris (FR)

(72) Inventors: Tony Delaplagne, Grenoble (FR); Laurent Vinit, Grenoble (FR); Grégory Païs, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/146,155

(22) Filed: Dec. 23, 2022

(65) Prior Publication Data

US 2023/0275431 A1    Aug. 31, 2023

(30) Foreign Application Priority Data

Dec. 24, 2021 (FR) .................................. 21 14498

(51) Int. Cl.
*H02J 3/06* (2006.01)
*H02J 3/28* (2006.01)
*F03B 17/06* (2006.01)

(52) U.S. Cl.
CPC .................. *H02J 3/06* (2013.01); *H02J 3/28* (2013.01); *F03B 17/06* (2013.01)

(58) Field of Classification Search
CPC ........ H02J 3/06; H02J 3/28; H02J 3/32; H02J 3/38; H02J 3/46; F03B 17/06
See application file for complete search history.

(56) References Cited

U.S. PATENT DOCUMENTS

2012/0119579 A1   5/2012  Jin et al.
2014/0312689 A1*  10/2014 Markowz ................ H02J 3/241
                                                          307/23
2016/0218551 A1*  7/2016  Sano ....................... H02S 40/38

FOREIGN PATENT DOCUMENTS

FR           3 011 885 A1    4/2015

OTHER PUBLICATIONS

French Preliminary Search Report and Written Opinion issued Aug. 1, 2022 in French Application 21 14498 filed on Dec. 24, 2021 (with English Translation of Categories of Cited Documents), 10 pages.

* cited by examiner

*Primary Examiner* — Lincoln D Donovan
*Assistant Examiner* — Alex W Lam
(74) *Attorney, Agent, or Firm* — Oblon, McClelland, Maier & Neustadt, L.L.P.

(57) ABSTRACT

A method for controlling a power supplied to an electrical network having a rated frequency, by an electrical production set comprising an electrical production plant and a battery energy storage system, comprises acquisition, by a hybridization controller, of a first signal representative of the power to be supplied to the electrical network; production, by the hybridization controller, of a power setpoint for the battery energy storage system; production, by the hybridization controller, of a substitution signal representative of the power to be supplied by the electrical production plant alone; and acquisition, by a plant controller comprising an input for acquisition of a signal representative of the power to be supplied by the electrical production plant, of said substitution signal.

15 Claims, 2 Drawing Sheets

METHOD FOR CONTROLLING A POWER SUPPLIED TO AN ELECTRICAL NETWORK, WITH HYBRIDIZATION CONTROLLER

TECHNICAL FIELD

The invention relates to the field of electrical energy production and of the management of the electrical energy distribution networks.

It relates more particularly to the strategies implemented in electrical production plants to maintain the frequency stability of the electrical networks.

PRIOR ART

In the management of electrical networks, there are many mechanisms, generally standardized, which make it possible at any moment to maintain the balancing between the consumption and the production of electrical energy. These mechanisms make it possible to stabilize the electrical specifications of the network at the local or national level, or on a wider scale.

For example, there is in Europe a first mechanism called "FCR" (for Frequency Containment Reserve) or "primary frequency control", which makes it possible to modulate the power produced by the electrical production sets as a function of the frequency deviation of the electrical network. This deviation in fact reflects an imbalance between production and consumption. Many specific solutions are implemented on the electrical production sets and make it possible to more or less rapidly respond to the frequency demands.

The frequency stabilization reserves react automatically to compensate the frequency deviations and stabilize the frequency at a standing value. The main technical requirement for primary frequency control is an automatic reaction proportional to the frequency deviations within a delay of a few seconds.

Moreover, the electrical networks are evolving towards a hybridization of the traditional electrical production plants with storage systems (batteries, fly wheels, etc.). This hybridization makes it possible to improve the overall performance levels of the system.

With the trend towards increasing the share of renewable energies in the energy package, the network fluctuation events are becoming difficult to anticipate given the local weather aspects at the solar or wind-turbine production plants.

The patent application EP 2721710 describes an electrical production set comprising an electrical production plant and a battery energy storage system, the function of which is to assist the electrical production plant in maintaining the rated frequency of the electrical network.

SUMMARY OF THE INVENTION

The aim of the invention is to improve the electrical production set management strategies of the prior art, within the context of maintaining the frequency stability of the network.

To this end, the invention targets a method for controlling a power supplied to an electrical network having a rated frequency, by an electrical production set comprising an electrical production plant and a battery energy storage system, this method comprising steps:

of acquisition of a first signal representative of the power to be supplied to the electrical network;

of acquisition of a second signal representative of the state of charge of the battery energy storage system;

of control of the electrical production plant and of control of the battery energy storage system, so as to supply a power to the electrical network as a function of the first signal and of the second signal.

In this method, the acquisition of the first signal is performed by a hybridization controller comprising an input for acquisition of a signal representative of the power to be supplied to the electrical network. This method additionally comprises the following steps:

determination, by the hybridization controller, of the power relative, on the one hand, to the electrical production plant, and, on the other hand, to the battery energy storage system;

production, by the hybridization controller, of a power setpoint for the battery energy storage system;

production, by the hybridization controller, of a substitution signal representative of the power to be supplied by the electrical production plant alone;

acquisition, by a plant controller comprising an input for acquisition of a signal representative of the power to be supplied by the electrical production plant, of said substitution signal;

production, by the plant controller, of setpoints for production members of the electrical production plant.

The steps described are not necessarily executed in the order indicated. In particular, some can be executed simultaneously.

The invention allows an efficient implementation of any regulation mechanism which an electrical energy producer is compelled to use, which demands a return to the rated frequency of the electrical network, within a determined time, in order to contribute, at its own level, to the balancing between the supply and the consumption of electrical power on the network.

The invention makes it possible to perform these conventional functions with a lesser invocation of the actuators, of the mechanical members or of other physical elements with which the electrical production plant is provided and whose control makes it possible to modulate the power that the plant supplies to the network.

These physical elements of the plant are liable to wear, require maintenance, and exhibit an activation energy cost. The battery energy storage system is best used to conserve these physical elements, by taking charge of the rapid and clear variations of the power to be produced. The use of a battery energy storage system offers the same advantages as those known from the prior art, notably the fact that the response of such storage systems is of the order of a second, and that they are thus very efficient in managing rapid rated frequency variations, requiring a rapid raising or lowering of the power supplied to the electrical network. The invention makes it possible to benefit from these advantages by controlling the battery energy storage system over its entire operating range, while reducing the degradation thereof, and doing so while conserving the electrical production plant. The control of the electrical production plant optimizes the use of the electromechanical members and contributes to reducing fatigue and mechanical ageing.

The invention is particularly suited to the field of support and contribution of production units of renewable origin to the stability of the electrical network. In particular, the hydroelectrical plants currently benefit from certain exemptions allowing them not to contribute to the primary frequency control, or to contribute thereto with planned response times. These exemptions are bound to disappear, and the invention notably allows the hybridization of these electrical production plants efficiently, inexpensively and non-intrusively.

The method according to the invention can comprise the following additional features, alone or in combination:
- the first signal and the substitution signal are of the same nature;
- the first signal is the frequency of the electrical network and the substitution signal is a hypothetical electrical network frequency;
- the method comprises a step of filtering of the first signal to extract therefrom a low-frequency component, the frequency of which is lower than a predetermined threshold, the substitution signal being produced at least from said low-frequency component;
- the filtering step comprises an operation of determination of the difference between the frequency of the electrical network and its rated frequency;
- in the filtering step, the filtering is applied to a signal made up of the continuous acquisition of said difference between the frequency of the electrical network and its rated frequency;
- the value of the rated frequency of the electrical network is combined with said low-frequency component to produce the substitution signal;
- the filtering step is performed by a low-pass filter, the cut-off frequency of which corresponds to said predetermined frequency threshold;
- the low-pass filter has a time constant corresponding to approximately one third of the time constant of the electrical production plant;
- the method comprises a step of production, by the hybridization controller, of a signal relating to the management of charge of the battery energy storage system, said signal being combined with said low-frequency component, to produce the substitution signal;
- the signal relating to the management of charge of the battery energy storage system relates to a target state-of-charge parameter of the battery energy storage system;
- in the step of production of a power setpoint for the battery energy storage system, the hybridization controller determines the electrical frequency stabilization power corresponding to the substitution signal;
- in the step of production of a power setpoint for the battery energy storage system, the hybridization controller determines, from the first signal, an expected total electrical network frequency stabilization power;
- the power setpoint for the battery energy storage system is produced from the difference between said expected total electrical network frequency stabilization power and said electrical frequency stabilization power corresponding to the substitution signal;
- the method comprises a mode of deactivation of the battery energy storage system in which the hybridization controller produces a substitution signal which reproduces the first signal;
- the method further comprises the following steps: filtering of the first signal to extract therefrom a low-frequency component, the frequency of which is lower than a predetermined threshold; production of setpoints for production members of the electrical production plant, from said low-frequency component; determination, from a model of the electrical production plant, of a theoretical power of stabilization of the frequency of the electrical network by the electrical production plant, this theoretical stabilization power being relative to the production of the electrical production plant alone with a view to a stabilization of the frequency of the electrical network, when said setpoints for production members of the electrical production plant are implemented; determination, from the first signal, of an expected total electrical network frequency stabilization power; production of a power setpoint for the battery energy storage system, from the difference between said expected total electrical network frequency stabilization power and said theoretical stabilization power;
- the electrical production plant is a hydroelectrical plant, said model of the electrical production plant being a hydroelectric plant model;
- said model of the electrical production plant comprises at least a plurality of power setpoints linked with the corresponding response time, necessary for the electrical production plant to reach the power corresponding to the setpoint;
- said model of the electrical production plant conforms to an equation correlating said theoretical stabilization power with: a signal representative of the production of setpoints for production members of the electrical production plant; a gain relative to the ratio between the power produced by the electrical production plant and the expected total electrical network frequency stabilization power; and a power response time constant, relative to the electrical production plant;
- in the step of determination of said theoretical stabilization power, said model of the electrical production plant is applied at least to said low-frequency component;
- said model of the electrical production plant is applied at least to a combination of said low-frequency component and of a signal relating to the management of charge of the battery energy storage system;
- the signal relating to the management of charge of the battery energy storage system relates to a target state-of-charge parameter of the battery energy storage system;
- in the filtering step, it is a signal made up of the continuous acquisition of said difference between the frequency of the electrical network and its rated frequency which is filtered to extract therefrom the low-frequency component;
- said model of the electrical production plant is applied to a signal combining at least the value of the rated frequency of the electrical network with said low-frequency component;
- the filtering step is performed by a first-order low-pass filter;
- the low-pass filter has a gain substantially equal to 1;
- the expected total electrical network frequency stabilization power is determined by a contractual coefficient $K_{FCR}$ multiplied by the difference between the frequency of the electrical network and its rated frequency.

DESCRIPTION OF THE FIGURES

Other features and advantages of the invention will emerge from the following non-limiting description, given with reference to the attached drawings in which.

Those elements that are similar and common to the various embodiments bear the same reference numbers in the figures.

DETAILED DESCRIPTION

Figure 1:
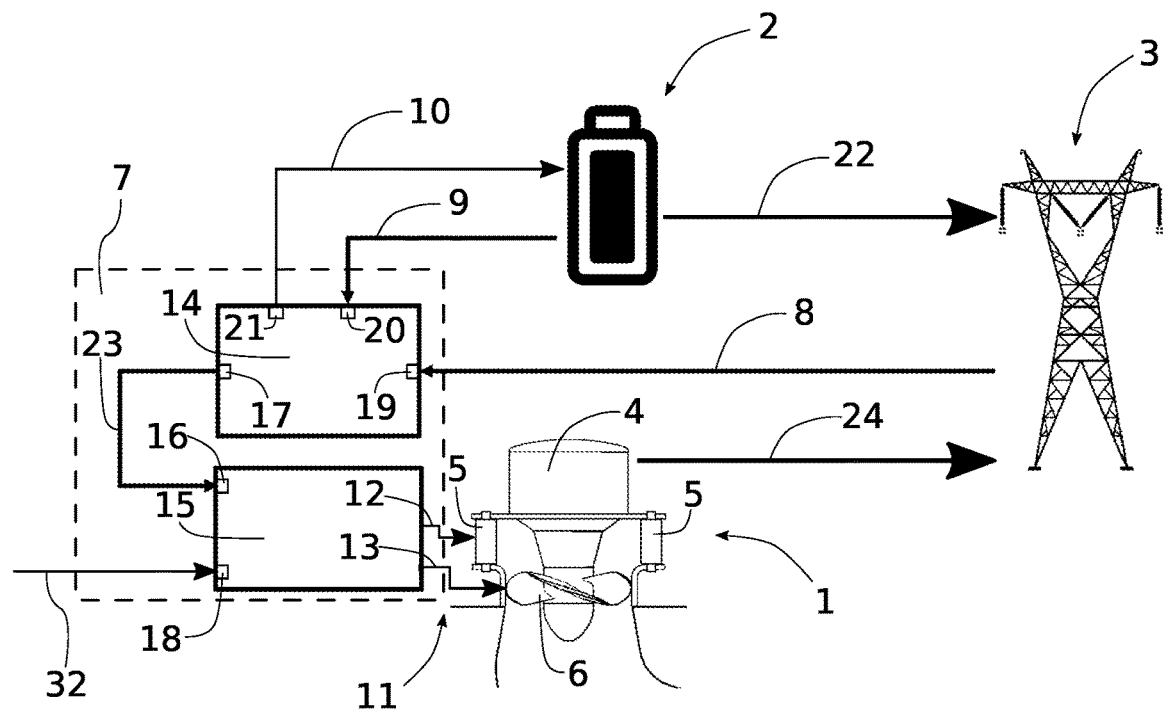
FIG. 1 is a schematic representation of a hybrid electrical production set, and of the associated electrical network.

FIG. 1 is a schematic view illustrating a hybrid electrical production set comprising an electrical production plant 1 and a battery energy storage system 2.

These production means supply the electrical network 3 (schematically represented by a high-voltage pylon in FIG. 1) with electrical power. The electrical network 3 has a rated frequency (for example 50 Hz in Europe).

The electrical production set is not only designed to supply a power to the electrical network, but is also dimensioned to contribute to the frequency balancing of the network. In this example, the electrical production set continuously contributes to the primary frequency control, with a parameterizable delay (which is, for example, 30 s on the French electrical network) to supply an adjusted power for frequency balancing, when a frequency imbalance occurs.

In this example, the electrical production plant 1 is a hydroelectrical plant schematically represented by a turbine 4. The electrical production plant 1 comprises physical means on which it is possible to act to vary the power that it produces. In this example, FIG. 1 schematically represents valves 5 designed to control the water flow rate feed to the turbine 4, and actuators 6 designed to control the inclination of the blades of the turbine 4. The action on the valves 5 and the actuators 6, following a given setpoint, makes it possible to control the power that the plant 1 supplies to the electrical network 3.

The battery energy storage system 2 is composed of any known electrical energy storage means suited to this application, for example a container of lithium-ion batteries. The storage system 2 is also designed to deliver or consume, on setpoint, a power on the electrical network 3.

The electrical production set comprises control means 7 which are physically composed, conventionally, of analogue and/or digital electronic elements, of computer hardware programmed for this purpose, etc.

These control means 7 are designed to receive:
- a signal 8 representative of the power to be supplied to the electrical network;
- a signal 9 representative of the state of charge of the storage system 2.

The control means 7 are further designed to supply:
- a power setpoint 10 for the storage system 2;
- setpoints 11 for production members 5, 6 of the plant 1.
  The setpoints 11 can comprise a certain number of setpoints, each intended for a specific physical member of the plant 1, acting on the power supplied.

In the present example, the setpoints 11 comprise a control setpoint 12 (degree of opening) of the valves 5 and a control setpoint 13 of the actuators of turbine blades (controlling the pitch of the turbine). As a variant, the setpoints 11 can comprise any setpoint directed towards other physical members of the plant 1 which contribute to the modulation of the power.

The control means 7 comprise a hybridization controller 14 and a plant controller 15.

The plant controller 15 is a conventional controller used commonly in electrical production plants. It comprises an input 16 for a signal representative of the power to be supplied to the electrical network and comprises outputs for delivering the setpoints 11 controlling the plant. The conventional positioning of such a plant controller 15 is to be connected to the electrical network by its acquisition input 16 in order to control only the power supplied by the electrical production plant. According to this conventional use, the plant controller 15 determines the power to be supplied to the electrical network directly and solely by the plant, and produces the setpoints 11 accordingly. Such a plant controller 15 is well known, and is based generally on a PID regulator, or any other monitoring and servocontrol system.

In the context of the invention, the plant controller 15 is positioned differently. The acquisition input 16 is not connected to the electrical network 3 but is connected to a plant control output 17 of the hybridization controller 14.

The hybridization controller 14 produces, by its output 17, a signal 23 called "substitution signal" which is representative of the power to be supplied by the plant 1 alone (that is to say without the energy storage device 2). This power is supplied by the plant to the point of connection with the electrical network. This power is therefore supplied to the electrical network and/or to the storage system 2 (notably when the latter is charging).

The substitution signal 23 produced by the hybridization controller 14 at its output 17 is supplied to the plant controller 15 which will act on the power produced by the plant 1, as a function of this substitution signal 23. The substitution signal 23 will previously have been shaped by the hybridization controller 14 for the hybridization requirements, and notably by taking account of the management of the energy storage system 2. The plant controller 15 is, for its part, only linked by its acquisition input 16 to the hybridization controller 14 which supplies the substitution signal 23 to it.

The plant controller 15 therefore receives, on its input 16, an input which is normally intended for a signal representative of the power to be supplied to the electrical network, a substitution signal 23 which is representative of the power that the plant 1 must supply, but not only to the electrical network 3.

The hybridization controller 14 comprises an acquisition input 19 for a signal representative of the power to be supplied to the electrical network, which is effectively connected to the electrical network, and over which the signal 8 representative of the power to be supplied to the electrical network effectively arises.

This signal 8 is representative of all of the power to be supplied to the electrical network 3 by all of the electrical production set (plant 1 and storage system 2).

In the present example, the signal 8 representative of the power to be supplied to the electrical network is a direct measurement of the frequency of the electrical network 3. Thus, this signal 8 provides the knowledge of the frequency of the electrical network at each instant and makes it possible to determine the deviation between the real frequency and the rated frequency. This signal 8 is thus directly representative of the power to be injected onto the network, by comprising a share of power dedicated to the primary control for the frequency balancing.

As a variant, the signal representative of the power to be supplied to the electrical network can be any other signal employed in electrical production, for example a setpoint from the manager of the electrical network directly indicating to the electrical production set the instantaneous power that it must supply.

In this example, the hybridization controller 14 proceeds, on its acquisition input 19, with a continuous measurement of the frequency of the electrical network, with appropriate accuracy (for example with an accuracy of the order of 1 MHz).

The hybridization controller 14 also comprises an acquisition input 20 for the signal 9 representative of the state of charge of the storage system 2. The signal 9 can be a conventional SOC (State Of Charge) signal, indicating the percentage charge of the storage system 2.

In addition to this input 20, the hybridization controller 14 can comprise any other input supplying useful data for the conventional management of the storage system 2. For example: battery alarms, alternating and direct voltages and currents, the powers involved, etc., to allow for the display, the control and the monitoring of the storage system 2.

The hybridization controller 14 further comprises an output 21 delivering the power setpoint 10 for the storage system 2. This setpoint 10 is for example a digital setpoint according to a suitable network protocol, or analogue, such as a current loop.

The hybridization controller 14 thus controls:
- directly, the storage system 2 which delivers, or consumes, a power 22 on the electrical network 3; and
- the plant 1, indirectly by supplying to the plant controller 15 a substitution signal 23 such that the plant 1 supplies a power 24 to the electrical network 3. This power 24 is supplied at the same point of connection to the electrical network as the power 22, such that the power 24 can make it possible to recharge the storage system 2.

Each of the energy sources (plant 1 and storage system 2) produces the electrical power as a function of its setpoints. For the storage system 2, the setpoint calculated by the hybridization controller 14 complements the power supplied by the plant 1 in order to obtain an overall power injected onto the network $P_{FCR}$ linked with the frequency deviation.

Generally, the producers which contribute to the primary frequency control produce a rated power (linked to a nominal setpoint) which is then modulated as a function of the frequency deviation. On the hydroelectric installations, this nominal setpoint can be a setpoint of power to be produced or else a setpoint of water flow-rate to be turbined. Indeed, on the dams of the "run-of-the-river" type equipped with Kaplan turbines, the objective can be regulation of the water levels upstream and downstream of the installation, in order to ensure navigability of the river. To address this objective, the electrical production plant can be driven according to a nominal setpoint 32 of water flow-rate to be turbined type, received on an input 18 of the plant controller 15.

The power produced as seen by the electrical network is therefore the algebraic sum of the powers produced by the plant and by the battery storage system:

$$P_{Grid}=P_{HPP}+P_{BESS} \quad \text{(equation 1)}$$

with:
$P_{Grid}$: Power supplied to the electrical network;
$P_{HPP}$: Power supplied by the plant;
$P_{BESS}$: Power supplied or consumed by the storage system.

However, in the primary frequency control, the power relating to this control is only the share of power which is linked to the frequency deviation. This power is the sum of the power produced by the plant, and linked only to the frequency deviation, and the power supplied or consumed by the storage system (the storage system is used here only for the primary frequency control):

$$P_{FCR}=P_{HPP/FCR}+P_{BESS} \quad \text{(equation 2)}$$

with:
$P_{FCR}$: Primary frequency control power (total power intended to compensate the frequency deviation);
$P_{HPP/FCR}$: Power supplied by the plant linked only to the frequency deviation;
$P_{BESS}$: Power supplied or consumed by the storage system.

This primary frequency control power $P_{FCR}$ is generally contractually agreed between the manager of the electrical network and the energy producer. A coefficient ($K_{FCR}$) is set and contractually agreed between the two parties:

$$P_{FCR}=K_{FCR}*\Delta F \quad \text{(equation 3)}$$

with:
$P_{FCR}$: Primary frequency control power;
$K_{FCR}$: Contractual coefficient;
$\Delta F$: Difference between the rated frequency and the frequency of the network at the instant t.

The control of the two production sources (plant 1 and storage system 2) is performed in order to satisfy the equations (1), (2) and (3) at each instant.

Figure 2:
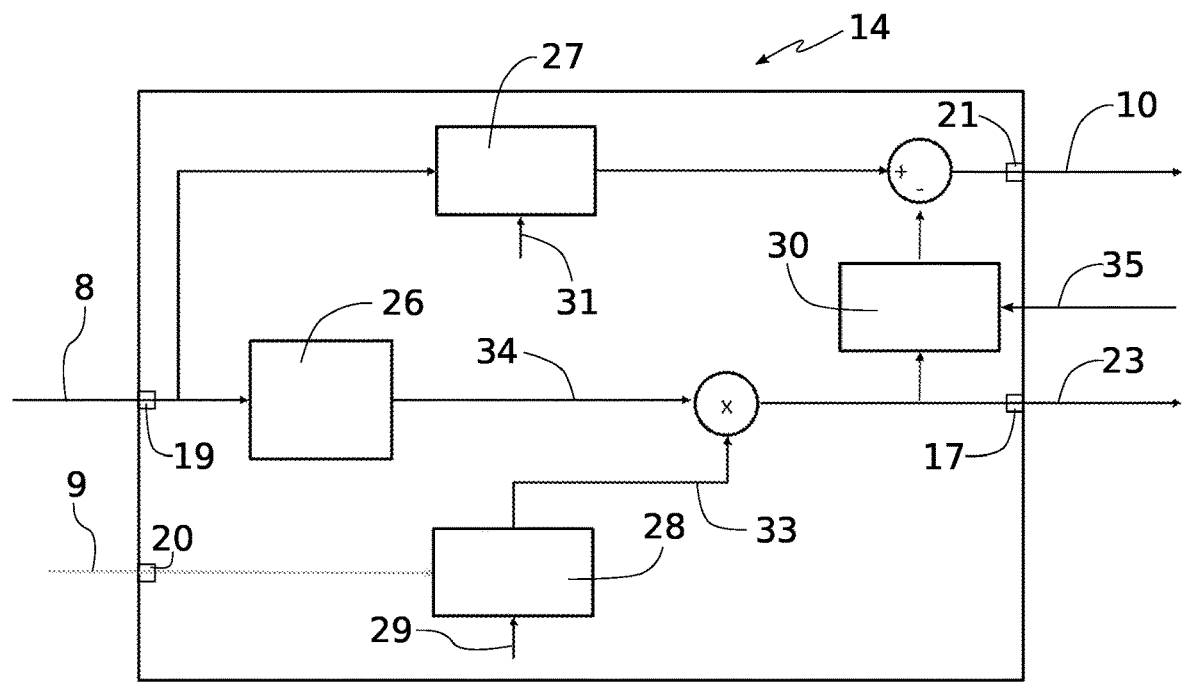
FIG. 2 is a block diagram illustrating the hybridization controller of FIG. 1.

FIG. 2 is a block diagram of the operating elements of the hybridization controller 14.

The signal 8 (here the frequency of the network) passes through a filtering block 26 which makes it possible, using a low-pass filter, to keep only the slow trend of the frequency. The signal 8 is thus filtered to extract from it a low-frequency component 34, the frequency of which is lower than a predetermined threshold. This filter may be of the first-order low-pass filter type with a cut-off frequency corresponding to said predetermined frequency threshold, and the time constant of which has to be adapted as a function of the response time desired for the electrical production set, following a frequency imbalance of the network.

A good trade-off is to choose a time constant of the low-pass filter corresponding to ⅓ of the time constant of the plant 1, i.e., for example, 30 s when the time constant of a hydroelectric plant is of the order of 100 s. The signal obtained by the block 26 is then modulated as a function of the level of charge of the storage system 2, to produce the substitution signal 23 on the output 17.

The substitution signal 23 is of the same nature as the signal 8. In this case, the substitution signal 23 is therefore an electrical network frequency. However, this is not a real electrical network frequency, but a hypothetical frequency to which it is desirable for the power production by the plant 1 to respond, via the plant controller 15, for the plant to supply the power calculated in the context of the hybridization, in particular to take account of the charge of the storage means 2.

The substitution signal 23 is produced at least from the low-frequency component 34 (of the power dedicated to the frequency control). In this example, the substitution signal 23 is produced from the combination of the low-frequency component 34 with the charge management signal 33 from the block 28 (battery charge management).

The signal 8 passes also through a second block 27 which calculates, at the instant t, the total power expected by the network manager, for the stabilization of the frequency of the network, given the frequency deviation (see equation 3). The block 27 comprises a parameter 31 corresponding to the contractual coefficient $K_{FCR}$.

The power setpoint 10 sent to the storage device 2 is the difference between said expected total electrical network frequency stabilization power and the power produced by the plant 1 (see equation 2).

The block 30 makes it possible to determine the power produced by the plant, this power which relates to the setpoints sent to the plant 1. In the present example, this power produced relates to the substitution signal 23 sent to the plant controller 15. The block 30 uses a simplified model of the behaviour of the plant 1. This model can be an analogue or digital model, which will be able to be obtained easily from physical calibrations on the plant 1, or by digital simulation, with conventional tools, or automatic identification, accessible to the person skilled in the art. A model can also be obtained from physical measurements performed on the plant following a measurement campaign, or even an experimental design, with the production of setpoints and the corresponding measurements of the produced power response time, of the gains, etc. A model formed in real time, over time, according to machine learning principles, can also be envisaged.

The model comprises at least a plurality of power setpoints correlated with the corresponding response time, necessary for the electrical production plant to reach the power corresponding to the setpoint.

The model is linked with the complexity of the response of the plant. It is preferably simplified given the tolerances on power response granted by the network manager. Indeed, the electrical network managers, or the regulatory framework, grant a downward error between the produced power and the expected power (of the order of 20% for example). Thus, a first-order model with a fixed time constant will be suitable. In the case of non-linear systems, a look-up table can also be used to translate the different produced powers as a function of the operating conditions of the machines of the plant 1. These operating conditions can be ported to the model by an operating signal 35. This signal 35 can, for example, relate to the water levels upstream and/or downstream of the plant 1, and/or to a production setpoint sent by the manager of the electrical network.

The block 30 thus corresponds to the determination, from the model of the plant 1, of a theoretical power of stabilization of the frequency of the electrical network by the plant 1 alone. This theoretical power relates to the production of the electrical production plant alone with a view to a stabilization of the frequency of the electrical network 3, and this is when the setpoints 11 for the production members 5, 6 of the plant 1 are implemented.

The model of the plant 1 can, primarily or in addition, conform to an equation correlating the theoretical stabilization power with: a signal representative of the production of the setpoints 11 for production members 5, 6 of the electrical production plant 1 (this representative signal being, in this example, the frequency setpoint seen by the plant controller 15); a gain relating to the ratio between the power produced by the plant 1 and the expected total electrical network frequency stabilization power; and a power response time constant, relating to the electrical production plant 1.

For example, the model of the plant 1 can be given in the form of the following Laplace equation:

$$\frac{PHPP'_{FCR}}{(50-F(p))} = \frac{K_{FCR}}{1+\tau_{hyd}p}$$

with:
$PHPP_{FCR}(p)$: The estimation of the power produced by the plant linked only to the frequency deviation (in MW);
$F(p)$: The frequency setpoint seen by the controller 15 of the plant 1 (signal 23 in Hz), considering a rated frequency of 50 Hz;
$K_{FCR}$: The steady-state gain between the produced power and the frequency deviation (in MW/Hz); and
$\lambda_{hyd}P$: The power response time constant, identified on the plant (in seconds).

This model, which can therefore notably be based on a first-order model, makes it possible to easily obtain the component of the power produced by the plant 1, which is linked to the frequency control, that is to say the control whose purpose is to contribute to the frequency balancing of the network. Indeed, the power produced by the plant 1 has two components:
a majority component linked to the power control or to the turbined flow rate which represents more than 90% of the power produced;
a minority component linked to the compensation of the frequency deviation, and which represents less than 10% of the power produced.

The model makes it possible to easily extract these components from the substitution signal 23, without having to use difficult filtering techniques which lack robustness, given the fact that the power measurement signal is generally greatly disturbed and noisy. It appears that, notably on the hydraulic installations, the flow rate variations induced by the frequency control generate shockwaves and pressures which, by echo, generate new power variations in addition to those sought by the primary frequency control.

The use of a model of the plant 1 is thus particularly suitable for a hybrid hydroelectric plant, and mitigates the difficulty in taking reliable instantaneous measurements of the mechanical/electrical response to demand variations on these installations.

The block 28 assists in the production of the substitution signal 23, and is responsible for the modulation of this signal to incorporate the issues of management of the charging and discharging of the storage system, in power production of the plant 1, and thus transparently for the plant 1, the plant controller 15 of which only responds conventionally to a signal of the same nature as the signal representative of the power to be produced (the reconstituted signal 23). The storage system 2 is in fact recharged only by the plant 1.

The block 28 makes it possible to modulate the power produced by the plant 1 as a function of the level of charge of the storage system 2. The block 28 can be a block implementing conventional algorithms in battery management, in which batteries are recharged over power production moments, and supply power over other moments.

Functionally, the block 28 makes it possible, when the storage system is discharged and when the plant 1 produces more power than is demanded (for example when the frequency of the network is above 50 Hz and is in the process of decreasing), to leave the power production setpoint of the plant 1 at its operating point and to use this surplus of energy (relative to the expected total electrical network frequency stabilization power) to recharge the batteries of the storage system 2.

Preferably, the further the state of charge of the storage device 2 is away from its optimum charge point, the less quickly does the plant 1 revert to the operating point dictated by the signal 8 and the more the surplus of energy produced makes it possible to recharge the batteries of the storage device.

The optimum charge point can be set for the storage device by a "target state-of-charge" parameter 29 which is supplied to the block 28. The parameter 29 is preferably set at around 50% and makes it possible to have the storage system operate within an optimal zone for its batteries, both in terms of performance (acceptance of significant positive and negative powers), and with respect to reducing degradations and optimizing its life's span (the calendar life of batteries maintained at 50% of their maximum charge is optimal).

Preferably, the phase-shift between the substitution signal 23 and the signal 8 originating from the electrical network is driven by the level-of-charge deviation of the batteries. That allows for an optimum management of the recharge moments of the storage system. Furthermore, this recharging strategy is done without disturbing the electrical network (the value of the power produced is always that expected by the network manager and it is never consumed from the latter) and without significantly increasing the power produced by the plant 1.

The block 28 thus produces a charge management signal 33, relating to the management of the storage system 2, which will be combined with the low-frequency component 34 to produce the substitution signal 23.

Figure 3:
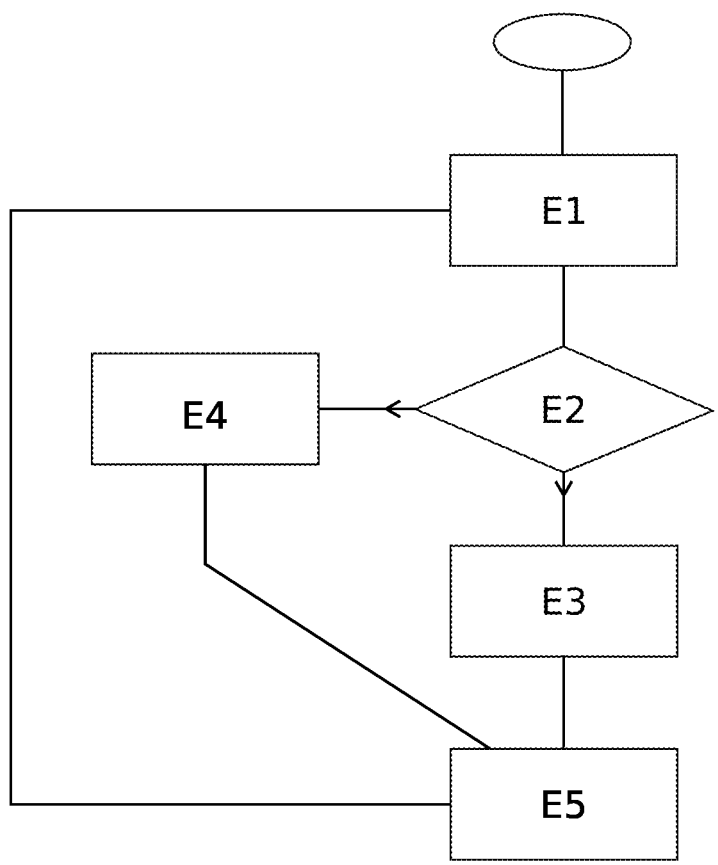
FIG. 3 is a block diagram illustrating the method according to the invention.

The operation of the hybridization controller 14 is explained hereinbelow with reference to the algorithm of FIG. 3.

After an initialization step, a first step E1 consists in acquiring the different input signals available to the hybridization controller 14. In this example, these are the signal 8 representative of the power to be supplied to the electrical network (in this example, the frequency of the electrical network), the power supplied by the plant 1, the power supplied by the storage system 2, the state of charge of the storage system 2 (the signal 9).

The next step E2 determines whether the frequency control function (primary control, in this example) involving the storage system 2 is indeed active. If such is the case, the method goes onto the next step E3 and, otherwise, the method goes to the alternative step E4.

In fact, the use of the storage system 2 for the frequency control function can be deactivated, for example in cases of maintenance of the storage system 2. Thus, in the step E4, the storage system 2 being deactivated, the hybridization controller 14 supplies, by its output 17, to the acquisition input 16 of the plant controller 15, a signal which is the exact copy of the signal that the hybridization controller 14 received on its input 19. The hybridization controller becomes transparent and the plant controller 15 receives on its input 16 a signal which corresponds precisely to the signal 8 (here: the frequency of the electrical network 3). In this mode of deactivation of the storage system 2, the hybridization controller 14 therefore produces a substitution signal 23 which copies the signal 8.

The electrical production set operates in this case as an electrical production plant without hybridization contributing to the primary frequency control, receiving, directly on its plant controller 15, the frequency of the electrical network and acting only on the elements of the production plant itself, and not on the storage system.

Following the step E4, the step E5 is a step in which the control setpoints are produced. In the case of the step E5, which follows the step E4 (storage system 2 deactivated), only the substitution signal 23 intended for the plant controller 15 is generated and corresponds to the direct copy of the signal 8. The power setpoint 10 for the storage system 2 is set to zero, with respect to the primary frequency control.

This setpoint can however not be zero when the level of charge of the storage system 2 becomes too low (loss of energy intrinsic to the storage system 2). In fact, a recharging manager can be implemented in this step in order to maintain the storage system 2 at its optimum level of charge, independently of the primary frequency control.

Preferably, the step E5 determines the value of the deviation between the rated frequency of the electrical network and the frequency measured at that instant (acquired on the input 19 of the hybridization controller 14). It is this deviation value which is then passed to the low-pass filter (block 26 in FIG. 2) to produce the low-frequency component 34 of this difference in frequencies. This low-frequency component 34 (of the power dedicated to frequency control) will then be combined with the charge management signal 33 from the block 28 (battery charge management), to produce the substitution signal 23. In the present example, in which it is the value of the difference $\Delta F$ between the frequency and the frequency of the network which is passed to the low-pass filter (block 26), the combination producing the substitution signal 23 additionally comprises the value of the rated frequency of the network.

Alternatively, when the frequency control function is activated, the method determines, in the step E3, in the hybridization controller 14, the different commands to be produced to control the plant 1 and the storage system 2.

These commands will be implemented in the step E5, which, in this case, will see the hybridization controller 14 produce the power setpoint 10 for the storage system 2, and the substitution signal 23 intended for the plant controller 15 so as to indirectly control the power to be produced by the plant 1.

The method then loops back to the step E1.

In the context of the implementation of the invention for primary frequency control, the looping between the steps E1 and E5 can be performed approximately every second, which is compatible with the requirement of power production in less than 30 seconds in response to a network frequency imbalance.

In the present illustrative example, the electrical plant 1 is a hydroelectric plant with a rated power in the region of 40 MW. The storage system 2, composed of lithium-ion batteries, has a storage capacity of 400 kWh and a power of 650 kW.

Measurements performed in this application show that the invention makes it possible to improve the frequency control performance by a ratio of 10. Furthermore, the battery energy storage system implemented in the context of the invention makes it possible to reduce the linear displacements of the actuators of the plant by more than 50% and to reduce by 70% the changes of direction of these actuators. This makes it possible to significantly reduce the use and therefore the wear of the mechanical parts of the hydroelectric plant.

Variant embodiments can be implemented. In particular, the example described refers to primary frequency control, it being understood that it is applicable to any type of frequency control (secondary, tertiary, or relating to other regulations), even with different parameters and demands.

The invention claimed is:

1. A method for controlling a power supplied to an electrical network having a rated frequency, by an electrical production set comprising an electrical production plant and a battery energy storage system, the method comprising:
acquiring a first signal representative of the power to be supplied to the electrical network;

acquiring a second signal representative of a state of a charge of the battery energy storage system;

controlling the electrical production plant and controlling the battery energy storage system, so as to supply the power to the electrical network as a function of the acquired first signal and of the acquired second signal, wherein the acquiring of the first signal is performed by a hybridization controller comprising an input for acquisition of a signal representative of the power to be supplied to the electrical network, and the method further comprises determining, by the hybridization controller, the power relative to the electrical production plant, and to the battery energy storage system;

producing, by the hybridization controller, a power setpoint for the battery energy storage system;

producing, by the hybridization controller, a substitution signal representative of the power to be supplied by the electrical production plant alone;

acquiring, by a plant controller, which includes an input for acquisition of a signal representative of the power to be supplied by the electrical production plant alone, said substitution signal; and producing, by the plant controller, setpoints for production members of the electrical production plant.

2. The method according to claim 1, wherein the first signal and the substitution signal are of a same nature.

3. The method according to claim 2, wherein the first signal is a frequency of the electrical network and the substitution signal is a hypothetical electrical network frequency.

4. The method according to claim 1, further comprising filtering the first signal to extract therefrom a low-frequency component, a frequency of which is lower than a predetermined threshold, the substitution signal being produced at least from said low-frequency component.

5. The method according to claim 4, wherein the filtering step further comprises determining a difference between the frequency of the electrical network and the rated frequency.

6. The method according to claim 5, wherein, in the filtering step, the filtering is applied to a signal made up of the continuous acquisition of said difference between a frequency of the electrical network and the rated frequency.

7. The method according to claim 6, wherein the value of the rated frequency of the electrical network is combined with said low-frequency component to produce the substitution signal.

8. The method according to claim 4, wherein the filtering step is performed by a low-pass filter, the cut-off frequency of which corresponds to said predetermined threshold.

9. The method according to claim 8, wherein the low-pass filter has a time constant corresponding to approximately one third of a time constant of the electrical production plant.

10. The method according to claim 4, further comprising producing, by the hybridization controller, a signal relating to management of the charge of the battery energy storage system, said signal being combined with said low-frequency component, to produce the substitution signal.

11. The method according to claim 10, wherein the signal relating to the management of charge of the battery energy storage system relates to a target state-of-charge parameter of the battery energy storage system.

12. The method according to claim 1, wherein, in the step of producing the power setpoint for the battery energy storage system, the hybridization controller determines an electrical frequency stabilization power corresponding to the substitution signal.

13. The method according to claim 12, wherein, in the step of producing the power setpoint for the battery energy storage system, the hybridization controller determines, from the first signal, an expected total electrical network frequency stabilization power.

14. The method according to claim 13, wherein the power setpoint for the battery energy storage system is produced from a difference between said expected total electrical network frequency stabilization power and said electrical frequency stabilization power corresponding to the substitution signal.

15. The method according to claim 1, further comprising a deactivating the battery energy storage system, in which the hybridization controller produces the substitution signal which reproduces the acquired first signal.

* * * * *